S. L. CHEYNEY.
Fruit and Grain Drier.
No. 77,253.
Patented April. 28, 1868.
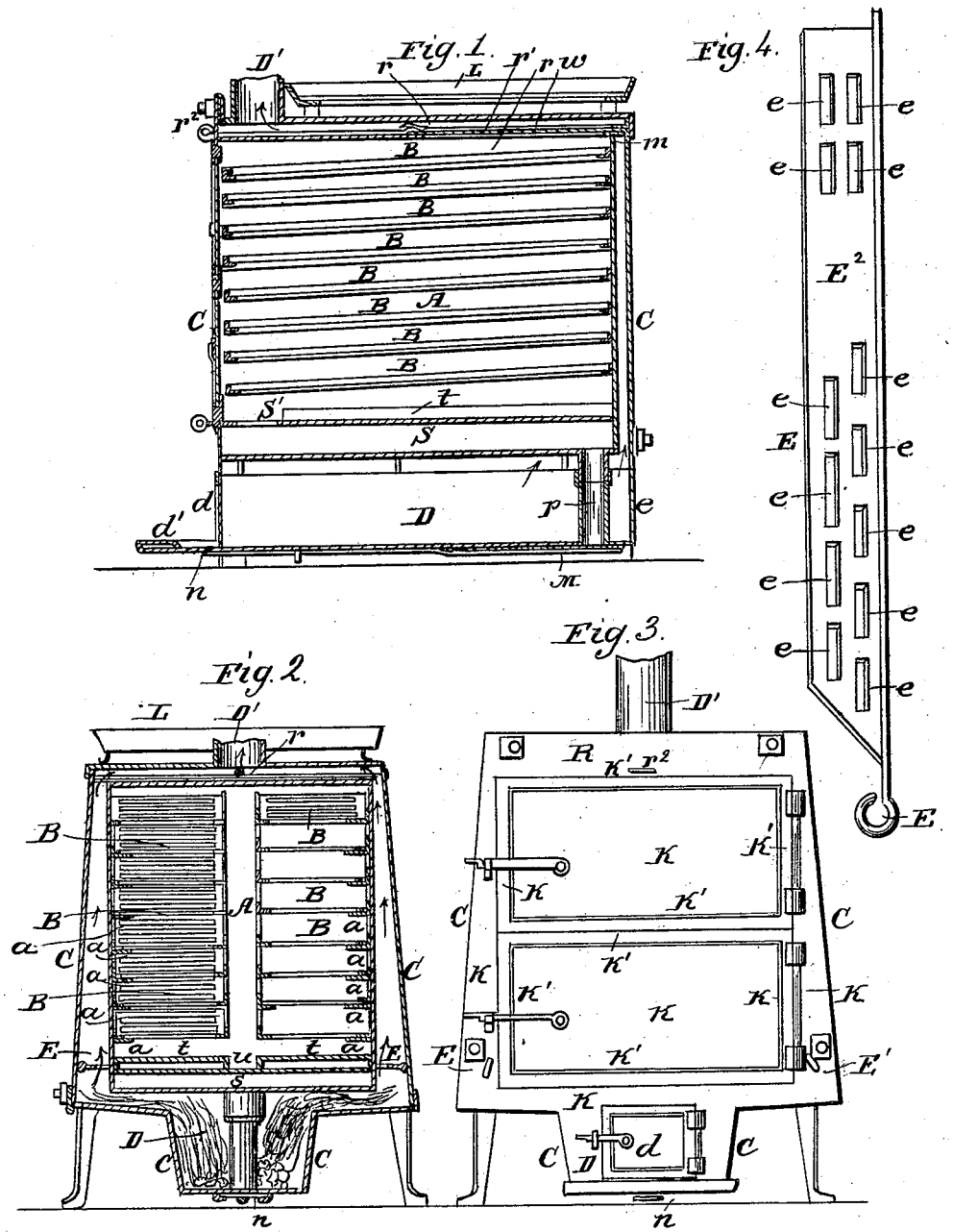

United States Patent Office.

SOLON L. CHEYNEY, OF WOOSTER, OHIO.

Letters Patent No. 77,253, dated April 28, 1868.

IMPROVEMENT IN DRIERS.

The Schedule referred to in these Letters Patent and making part of the same.

TO ALL WHOM IT MAY CONCERN:

Be it known that I, SOLON L. CHEYNEY, of Wooster, in the county of Wayne, and State of Ohio, have invented a new and improved Fruit and Grain-Drier; and I do hereby declare that the following is a full, clear, and exact description of the construction and operation of the same, reference being had to the annexed drawings, making a part of this specification, in which—

Figure 1 is a longitudinal vertical section.
Figure 2 is a cross-section.
Figure 3 is an end elevation.
Figure 4 is a detached view of the regulator.

In this invention, the fruit is dried in an oven by means of a current of hot air caused to flow over it from a heater beneath. The peculiar construction of the apparatus, by which the current is properly directed, and its heat utilized to the fullest extent, constitutes the main feature of the invention.

In the drawings, A represents the oven or chamber in which the fruit is dried, its inner walls being provided with brackets $a\ a$, upon which rest the shelves B B, that support the fruit. I construct this oven generally in the form of a rectangular chamber, as shown in the drawings, though any other form might be used that would answer the purpose as well. The walls and roof of this chamber are of sheet iron.

The chamber, thus constructed, is enclosed in an outer shell, C C, of iron, and so attached and supported within the shell that it occupies the position shown in figs. 1 and 2. The outer shell is so formed as to converge toward the walls of the oven, from the bottom to the top of the apparatus, as seen in fig. 2.

The bottom of the outer shell has a deep longitudinal depression, shown at $c\ c$, which forms a furnace, D. A door, $d$, is provided for it at the front end of the apparatus, and a hearth, $d'$, is attached, as seen in fig. 1. The fire is placed in this furnace, the smoke, from which passes up around the sides and rear end of the oven A, and over its top, to the flue $D'$, through which it escapes. Its course is clearly shown by the red arrows in the drawings.

In order to properly distribute the heat thus carried to all parts of the oven, I attach on each side of it, as shown at E E, fig. 2, the regulator represented in fig. 4. This regulator extends the whole length of the shell C, and is provided with a handle, $E^1$, by which it may be turned, like a common stove-damper. Its function is to distribute the current of hot air, smoke, &c., that is rising at the sides of the oven, in such a way that the heating of the sides of the oven may be perfectly uniform. The cold air, entering the furnace at the door $d$, would throw the hot air towards the rear end of the furnace, and would itself rise, half heated, at the front end, were nothing provided to counteract it. I accordingly interpose this regulator. At the point where the hottest air would rise, I do not perforate the regulator, but leave it to entirely intercept the current, as shown at $E^2$. Towards the rear end of the regulator I make a few apertures, because the ascending current at that end is somewhat checked by the obstruction $m$, hereafter explained; while at the front end of the regulator I provide a large number of perforations, $e\ e\ e\ e$, through which the most of the smoke, gases, &c., of the furnace pass up. The whole area of the perforations made in the regulator is to equal the area of a horizontal section of the space between the shell and the oven at the upper part of the side-walls of the latter, so that as much of the products of combustion will pass through the regulator as can escape over the top of the oven. This necessitates making the space between the walls of the oven and the shell wider at the bottom than the top, as hereinbefore referred to.

The current of hot air, smoke, &c., that rises at the sides and rear end of the oven, can pass in over the top of it, on its way to the flue $D'$, only at the sides, and from the middle to the front end of the top of the oven, the latter being extended across the space between the shell and the oven, as shown at $m$, fig. 1, and fitted against or riveted to the rear wall of the shell, so that the smoke, &c., cannot pass up beyond it, but coming against it, is obliged to turn forward along the sides of the oven. In passing along the sides of the latter, at the top of the apparatus, it is still further prevented from passing in over the top of the oven by means of a wall, $w$, which rises from the edge of the oven along its top, from its rear end to about its middle, and is fitted ainst the top of the shell, entirely obstructing the escape of the smoke, &c., over the oven, until in its course has passed beyond the forward end of the wall, as seen at $v$. As soon as it has passed the end, $v$, of the wall, is then free to enter the space over the oven, and it rushes in, escaping at the flue, as before explained.

Between the top of the furnace and the bottom of the oven is a space, $s$, which is filled with cold air from pipe, $p$, at its rear end. The air entering at the pipe is obliged to pass along through this narrow space to e front end of the oven, being thoroughly heated and dried in its course by the furnace beneath. Being disarged into the front end of the oven at the aperture $s'$, it rises among the shelves B B, coming in contact th all the fruit, and thoroughly drying it. It then escapes into the space over the oven through a wide aper- re, $r$, closed by a damper-slide, $r^1$, by which the flow of air through the apparatus is regulated. The passage s made at or towards the rear end of the roof of the oven, between the walls $w\ w$, in order that the smoke, &c., may be prevented by those walls from passing down among the fruit, and for the further purpose of causing e current of hot air that enters the oven at $s'$ to traverse the whole length as well as height of the oven, oroughly heating every part of it, and conveying away all the vapor, &c., from the fruit to the flue.

In order that the bottom shelves may not receive too much heat, I obstruct the radiation from the floor, on ch side of the oven, by providing two receptacles, $t\ t$, filled with some non-conducting substance. A space, is left along the centre of the floor, between the non-conductors, which permits a free radiation from the or, and produces a temperature at the centre of the oven equal to that at the sides. The shelves B B are ranged in two columns, over the non-conductors, as seen in fig. 2, the space between them coming directly er the space $u$. The heat radiated from the thin metallic floor at $u$ is carried up between the columns of elves, meeting with no obstruction, and is equally distributed. Instead of making two columns of shelves racks, each shelf may have a longitudinal slot or opening, extending nearly its whole length, and on each le of it a series of shorter openings, extending nearly from the central one to the side edges of the shelf. A oss-section of a series of shelves of this form, arranged one above another, would present the appearance own in fig. 2. The handle of the damper $r^1$ is shown at $r^2$.

Another damper, $n$, is provided under the apparatus, to regulate the flow of cold air into the pipe $p$.

A deep rack or pan, with slotted bottom, may be set on the top of the shell, as seen at L. When the fruit s been about three-fourths dried, it will be burned if allowed to remain in the oven heated to the same degree, d in order to save the trouble, delay, and expense of reducing the temperature of the oven, and then raising ain as a new lot of fruit is put into it, I take the partially-dried fruit out, and finish the drying of it in the ck L.

A great saving of expense may be effected in the construction of this apparatus if the bottom of the shell, ich is of cast iron, be cast with a deep groove along its side and rear edges, into which the lower edge of the eet-metal walls of the shell shall enter, and through the walls of which groove they may be securely riveted bolted. The front of the apparatus consists of a cast-iron plate or frame, K, cast with a groove to receive e ends of the walls of the shell, and on its front side provided with one or more doors, $k\ k$. These doors, for e purpose of lightness and economy, may be made of a cast-iron frame, $k'$, extending around their edges, eir centre being of sheet iron, riveted to the frame around it.

Having thus described my invention, what I claim as new, and desire to secure by Letters Patent, is—

1. In an apparatus for drying fruit, I claim the arrangement of the furnace D, chamber $s$, drying-oven A, pe $p$, and aperture $s'$, by which the cold air is caused to traverse the whole length of the furnace, in contact th the floor of the drying-oven, in order to thoroughly heat it and utilize its heat, substantially in the man- ir and for the purposes specified.

2. In an apparatus for the purpose specified, I claim the flange $m$ and wall $w$, in combination with the erture $r$ and damper $r^1$, substantially as and for the purposes set forth.

3. I claim the non-conducting beds $t\ t$, when arranged along the bottom of the drying-oven, and leaving e space $u$ between them, for the purpose specified.

4. I claim the regulator E, when constructed with the openings $e\ e$, arranged in the manner and for the rposes specified.

The above specification of my invention signed by me, this 11th day of February, 1868.

S. L. CHEYNEY.

Witnesses:
   M. F. McDOWELL,
   AMBER LACHAT.